United States Patent
Wortman et al.

(10) Patent No.: US 6,447,135 B1
(45) Date of Patent: Sep. 10, 2002

(54) LIGHTGUIDE HAVING A DIRECTLY SECURED REFLECTOR AND METHOD OF MAKING THE SAME

(75) Inventors: David L. Wortman, Stillwater; Sanford Cobb, Lakeland; Kenneth A. Epstein, St. Paul, all of MN (US); Mark E. Gardiner, Santa Rosa, CA (US); Wade D. Kretman, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/414,124

(22) Filed: Oct. 8, 1999

(51) Int. Cl.⁷ .............................................. F21V 7/22

(52) U.S. Cl. .................................... 362/31; 362/327

(58) Field of Search ......................... 362/31, 326, 327, 362/330, 349

(56) References Cited

U.S. PATENT DOCUMENTS

| | | | |
|---|---|---|---|
| 586,214 A | 7/1897 | Basquin | 359/595 |
| 586,220 A | 7/1897 | Basquin | 359/595 |
| 586,247 A | 7/1897 | Soper | 359/592 |
| 586,248 A | 7/1897 | Soper | 359/595 |
| 586,249 A | 7/1897 | Soper | 359/595 |
| 586,251 A | 7/1897 | Soper | 359/593 |

(List continued on next page.)

FOREIGN PATENT DOCUMENTS

| | | | | |
|---|---|---|---|---|
| EP | 0 167 721 A1 | 1/1986 | | |
| EP | 0 534 140 A1 | 3/1993 | | |
| EP | 770 818 A2 | 2/1997 | | |
| EP | 0 770 818 A2 | 5/1997 | | F21V/8/00 |
| EP | 787 942 A2 | 6/1997 | | |
| EP | 0 787 942 A2 | 8/1997 | | F21V/8/00 |
| FR | 2 606 861 A1 | 5/1988 | | |
| GB | 806124 | 12/1958 | | |
| JP | 52-6496 | 1/1977 | | |
| JP | 54-127299 | 10/1979 | | |
| JP | 60-70601 | 4/1985 | | |
| JP | 60-73618 | 4/1985 | | G02F/1/133 |
| JP | 61-11782 | 1/1986 | | G09F/9/00 |
| JP | 61-158367 | 7/1986 | | G09F/9/00 |
| JP | 63-10402 | 1/1988 | | F21V/5/02 |
| JP | 2-28842 | 6/1990 | | G02B/5/00 |
| JP | 2-176629 | 7/1990 | | G02F/1/1335 |
| JP | 2-214822 | 8/1990 | | G02F/1/1335 |
| JP | 3-184020 | 8/1991 | | G02F/1/1335 |
| JP | 3-184021 | 8/1991 | | G02F/1/1335 |
| JP | 3-191329 | * 8/1991 | | |
| JP | 6-18707 | 1/1994 | | G02B/5/02 |
| JP | 6-82635 | 3/1994 | | G02B/6/00 |
| JP | 6-242322 | * 9/1994 | | |
| JP | 2559579 | 12/1996 | | G09F/9/00 |
| JP | 9-5528 | 1/1997 | | G02B/6/00 |
| WO | WO 89/02606 | 3/1989 | | G02B/5/02 |
| WO | WO 97/01726 | 1/1997 | | F21V/7/00 |

OTHER PUBLICATIONS

IBM Technical Disclosure Bulletin, vol. 29, No. 11, Backlighting for Liquid Crystal Display, Apr. 1987.
IBM Technical Disclosure Bulletin, vol. 31, No. 2, Flat Panel Backlight Reflecting Device, Jul. 1988.
IBM Technical Disclosure Bulletin, vol. 33, No. 1B, Polarized Backlight for Liquid Crystal Display, Jun. 1990.
IBM Technical Disclosure Bulletin, vol. 33, No. 9, High Efficiency Back Light for LCD, Feb. 1991.
International Search Report dated Dec. 1, 2000 for International Application No. PCT/US00/25619.

*Primary Examiner*—Sandra O'Shea
*Assistant Examiner*—Hargobind S. Sawhney
(74) *Attorney, Agent, or Firm*—Stephen W. Buckingham; Marshall, Gerstein, & Borun

(57) ABSTRACT

A lightguide includes an input edge surface, a back surface and an output surface. A reflector is directly secured to the back surface by, for example, adhesive bonding.

24 Claims, 4 Drawing Sheets

U.S. PATENT DOCUMENTS

| | | | | |
|---|---|---|---|---|
| 586,252 A | 7/1897 | Soper | ................. | 359/593 |
| 607,792 A | 7/1898 | Winger | ................. | 359/595 |
| 650,209 A | 5/1900 | White | ................. | 359/593 |
| 713,182 A | 11/1902 | Wadsworth | ................. | 359/595 |
| 719,066 A | 1/1903 | Wadsworth | ................. | 359/593 |
| 720,386 A | 2/1903 | Wadsworth | ................. | 359/593 |
| 720,987 A | 2/1903 | Wadsworth | ................. | 359/595 |
| 752,429 A | 2/1904 | Wadsworth | ................. | 359/594 |
| 755,196 A | 3/1904 | Wadsworth | ................. | 359/593 |
| 818,208 A | 4/1906 | Wadsworth | ................. | 359/592 |
| 2,099,034 A | 11/1937 | Rolph | ................. | 362/333 |
| 2,115,178 A | 4/1938 | Rolph | ................. | 362/331 |
| 2,143,148 A | 1/1939 | Guth | ................. | 362/291 |
| 2,179,863 A | 11/1939 | Rolph | ................. | 359/593 |
| 2,223,841 A | 12/1940 | Biller | ................. | 362/339 |
| 2,347,665 A | 5/1944 | Christensen et al. | ................. | 40/363 |
| 2,398,507 A | 4/1946 | Rolph | ................. | 362/148 |
| 2,714,816 A | 8/1955 | Pennell | ................. | 359/592 |
| 2,844,998 A | 7/1958 | Vincent | ................. | 359/593 |
| 3,721,818 A | 3/1973 | Stahlhut | ................. | 362/297 |
| 3,735,124 A | 5/1973 | Stahlhut | ................. | 362/333 |
| 3,994,564 A | 11/1976 | Somogyi | ................. | 349/68 |
| 4,053,208 A | 10/1977 | Kato et al. | ................. | 359/460 |
| 4,127,693 A | 11/1978 | Lemelson | ................. | 428/163 |
| 4,233,651 A | 11/1980 | Fabbri | ................. | 362/33 |
| 4,242,723 A | 12/1980 | Fabbri et al. | ................. | 362/33 |
| 4,298,249 A | 11/1981 | Gloor et al. | ................. | 349/112 |
| 4,337,759 A | 7/1982 | Popovich et al. | ................. | 126/684 |
| 4,416,515 A | 11/1983 | Funada et al. | ................. | 349/104 |
| 4,450,509 A | 5/1984 | Henry | ................. | 362/216 |
| 4,542,449 A | 9/1985 | Whitehead | ................. | 362/330 |
| 4,755,921 A | 7/1988 | Nelson | ................. | 362/307 |
| 4,804,253 A | 2/1989 | Stewart | ................. | 349/104 |
| 4,870,484 A | 9/1989 | Sonehara | ................. | 248/91 |
| 4,906,070 A | 3/1990 | Cobb, Jr. | ................. | 359/834 |
| 4,984,144 A | 1/1991 | Cobb, Jr. et al. | ................. | 362/339 |
| 5,005,108 A | 4/1991 | Pristash et al. | ................. | 362/31 |
| 5,022,728 A | 6/1991 | Fandrich | ................. | 385/31 |
| 5,079,675 A | 1/1992 | Nakayama | ................. | 362/31 |
| 5,126,882 A | 6/1992 | Oe et al. | ................. | 359/619 |
| 5,128,783 A | 7/1992 | Abileah et al. | ................. | 349/162 |
| 5,151,801 A | 9/1992 | Hiroshima | ................. | 349/95 |
| 5,161,041 A | 11/1992 | Abileah et al. | ................. | 349/62 |
| 5,190,370 A | 3/1993 | Miller et al. | ................. | 362/340 |
| 5,206,746 A | 4/1993 | Ooi et al. | ................. | 349/64 |
| 5,262,928 A | 11/1993 | Kashima et al. | ................. | 362/31 |
| 5,280,371 A | 1/1994 | McCartney, Jr. et al. | ................. | 349/64 |
| 5,394,255 A | 2/1995 | Yokota et al. | ................. | 349/64 |
| 5,396,350 A | 3/1995 | Beeson et al. | ................. | 349/62 |
| 5,402,324 A | 3/1995 | Yokoyama et al. | ................. | 362/19 |
| 5,467,208 A | 11/1995 | Kokawa et al. | ................. | 349/67 |
| 5,467,417 A | 11/1995 | Nakamura et al. | ................. | 385/36 |
| 5,499,138 A | 3/1996 | Iba | ................. | 359/569 |
| 5,521,797 A | 5/1996 | Kashima et al. | ................. | 362/31 |
| 5,550,657 A | 8/1996 | Tanaka et al. | ................. | 349/62 |
| 5,552,907 A | 9/1996 | Yokota et al. | ................. | 349/62 |
| 5,587,816 A | 12/1996 | Gunjima et al. | ................. | 349/62 |
| 5,592,332 A | 1/1997 | Nishio et al. | ................. | 359/619 |
| 5,594,830 A * | 1/1997 | Winston | ................. | 385/146 |
| 5,598,280 A | 1/1997 | Nishio et al. | ................. | 349/57 |
| 5,600,455 A | 2/1997 | Ishikawa et al. | ................. | 349/57 |
| 5,600,462 A | 2/1997 | Suzuki et al. | ................. | 349/112 |
| 5,627,926 A | 5/1997 | Nakamura et al. | ................. | 385/36 |
| 5,711,589 A * | 1/1998 | Oe | ................. | 362/31 |
| 5,735,590 A | 4/1998 | Kashima et al. | ................. | 362/31 |
| 5,779,337 A | 7/1998 | Saito et al. | ................. | 362/31 |
| 5,808,709 A * | 9/1998 | Davis | ................. | 349/65 |
| 5,828,488 A * | 10/1998 | Ouderkirk | ................. | 359/487 |
| 5,831,697 A * | 11/1998 | Evanicky | ................. | 349/62 |
| 5,999,243 A | 12/1999 | Kameyama et al. | ................. | 349/185 |
| 6,027,222 A | 2/2000 | Oki et al. | ................. | 362/31 |
| 6,166,790 A | 12/2000 | Kameyama et al. | ................. | 349/96 |
| 6,208,466 B1 * | 3/2001 | Liu | ................. | 359/584 |

\* cited by examiner

LIGHTGUIDE HAVING A DIRECTLY SECURED REFLECTOR AND METHOD OF MAKING THE SAME

BACKGROUND OF THE INVENTION

1. Field of the Invention

The invention relates generally to lightguides such as used for illuminating display devices, and more particularly, the invention relates to a lightguide having a directly secured reflector.

2. Description of the Related Technology

Backlit display devices, such as liquid crystal display (LCD) devices, commonly use a slab or wedge-shaped lightguide. The lightguide distributes light from a substantially linear source, such as a cold cathode fluorescent lamp (CCFL), to a substantially planar output. The planar light output of the lightguide is used to illuminate the LCD.

A measure of the performance of the display device is its brightness, and each of the components of the display device contributes, either positively or negatively, to its brightness. From a subjective standpoint, relatively small increases or decreases in overall brightness are not easily perceived by the end user of the display device. However, the display device designer is discouraged by even the smallest decreases in overall brightness including decreases so small they might only be perceived by objective measurement. This is because the display brightness and the power requirements of the display are closely related. If overall brightness can be increased without increasing the required power, the designer can actually allocated less power to the display device, yet still achieve an acceptable level of brightness. For battery powered portable devices, this translates to longer running times.

As is well known, the purpose of the lightguide is to provide for the distribution of light from the light source over an area much larger than the light source, and more particularly, substantially over an entire output surface area of the lightguide. In slab, wedge and pseudo-wedge lightguides, light typically enters the lightguide along an edge surface and propagates between a back surface and the output surface from the edge surface toward an opposing end surface of the lightguide by total internal reflection (TIR). In slab and certain wedge lightguides, the back surface includes structures, e.g., dots in a pattern, facets, etc. A light ray encountering one of these structures is redirected, i.e., either diffusely or specularly reflected, in such a manner that it is caused to exit the output surface. In other wedge lightguides, light is extracted by frustration of the TIR. A ray confined within the lightguide by TIR increases its angle of incidence relative to the plane of the top and bottom wall, due to the wedge angle, with each TIR bounce. The light eventually refracts out of the output surface at a glancing angle thereto, because it is no longer contained by TIR.

Some light rays also exit the back surface of the lightguide. Light rays also may be reflected by other elements of the display system back into the lightguide, and these light rays continue through the lightguide toward and through the back surface. To prevent the light rays that exit or pass through the back surface from being lost, it is known to provide a reflector adjacent the back surface to reflect these rays back into and through the lightguide. By providing the reflector the brightness of the lightguide is increased.

The light rays exiting the back surface of the wedge lightguide by frustration of TIR do so at an exit angle of about 65°–85°. Especially in the 80°–85° range, the percentage of exiting light rays is low due to the constraints of Fresnel surface reflection near the critical angle. However, once these rays have exited it is equally difficult for them to reenter the lightguide when reflected between the back surface and the parallel positioned specular reflector. The result is the light becoming trapped between the lightguide back surface and the reflector. With every encounter of the light rays with the reflector, losses occur. The result is a loss of light that might otherwise be used to contribute to display brightness.

SUMMARY OF THE INVENTION

In one aspect of the invention a lightguide includes an input edge surface, a back surface and an output surface. A reflector is directly secured to the back surface by, for example, adhesive bonding.

In another aspect of the invention, an illumination device includes a lightguide having an integral back reflector.

In still another aspect of the invention, a reflector is secured to a back surface of a lightguide by a patterned layer of adhesive.

In yet another aspect of the invention, a polarizer is directly secured to a lightguide by a layer of adhesive.

A method of making a lightguide with a directly secured reflector is also encompassed by the invention.

BRIEF DESCRIPTION OF THE DRAWINGS

The many advantages and features of the present invention will become apparent to one of ordinary skill in the art from the following detailed description of several preferred embodiments of the invention with reference to the attached drawings wherein like reference numerals refer to like elements throughout and in which.

DETAILED DESCRIPTION OF THE PREFERRED EMBODIMENTS

The invention is described in terms of several preferred embodiments, and particularly, in terms of a lightguide suitable for use in a backlighting system typically used in flat panel display devices, such as a laptop computer display or a desktop flat panel display. The invention, however, is not so limited in application and one of ordinary skill in the art will appreciate that it has application to virtually any optical system, for example, to flat panel televisions. Therefore, the embodiments described herein should not be taken as limiting of the broad scope of the invention.

Figure 1:
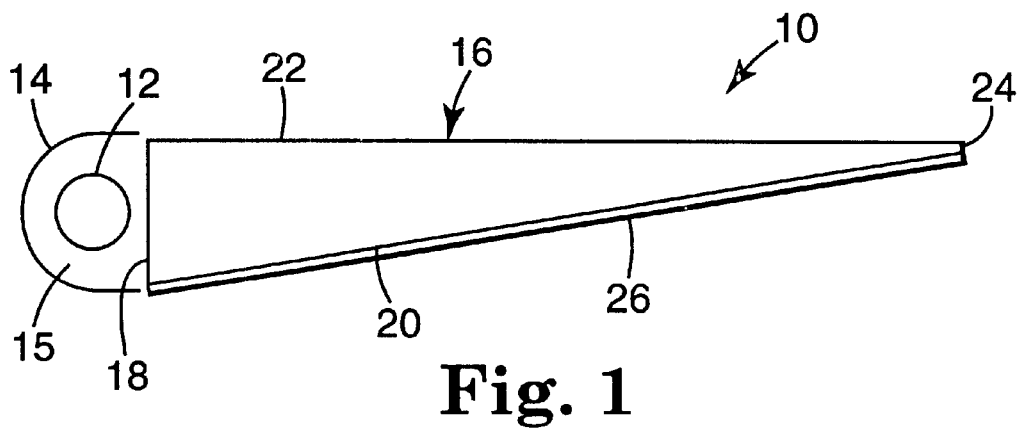
FIG. 1 is a schematic illustration of an illumination device including a wedge lightguide and a back reflector directly secured to the lightguide in accordance with an embodiment of the invention.

Referring to FIG. 1, an illumination system 10 includes a light source 12; a light source reflector 14 and a lightguide 16. The light source 12 may be a CCFL that provides light to an input edge surface 18 of the lightguide 16. The light source reflector 14 may be reflective film that wraps around the light source 12 forming a cavity 15.

The lightguide 16 may be an optically transmissive monolithic wedge including a back surface 20 and an output surface 22. The lightguide 16 also includes an end surface 24 opposing the input edge surface 18. It will be appreciated that the lightguide 16 may be a slab or a pseudo-wedge. Each of the back surface 20 and the output surface 22 is substantially plano with the back surface converging at the wedge angle toward the output surface. This configuration for the lightguide 16 provides for propagating light from the input edge surface 18 between the back surface 20 and the output surface 22 toward the end surface 24 by TIR and for the extraction of light by frustration of the TIR.

Directly secured to the back surface 20 is a high efficiency specular reflector 26. Preferably the reflector is 85% reflective, more preferably 95% reflective and most preferably greater than 97% reflective, i.e., less than 3% absorptive losses. Also, the reflector 26 should remain fully specular as a reflector about an entire expected range of incident angles. In a preferred embodiment, the reflector 26 is a mirror film that is directly secured, such as by lamination using an adhesive, to the back surface 20. In this regard, the reflector 26 may be a 3M High Reflective Visible Mirror product available from the Minnesota Mining and Manufacturing Company of St. Paul, Minn., that is formed of numerous polymeric layers. Alternatively, the reflector 26 may be a film formed by the vacuum deposition of numerous layers of polymeric material. Such a film would require numerous layers wherein particular layers are arranged to reflect particular light wavelengths.

The lamination of the reflector 26 to the back surface 20 may be accomplished by adhesive bonding using UV cure, pressure sensitive or other suitable adhesives. Alternatively, the reflector 26 may be formed on the back surface 20 using a deposition process, e.g., a metal deposition process, or other methods of laying down reflective surface. Directly securing the reflector 26 to the back surface 20 provides an efficient specular reflector that retains the TIR containment of the light being guided. In addition, directly securing the reflector reduces or eliminates losses that occur due to the trapping of light between the back surface 20 and the reflecting surface of the reflector 26. The reflector 26 further acts as a low loss specular reflector to light reentering the lightguide 16 in recycling, brightness enhanced systems.

The reflector 26 may be bonded to the lightguide 16 using a uniformly distributed slightly diffuse adhesive. In a wedge lightguide, the diffuse adhesive acts as the frustrator of TIR. The diffuse adhesive can also act to very slightly scatter recycled light in non-one pass systems.

Figure 2:
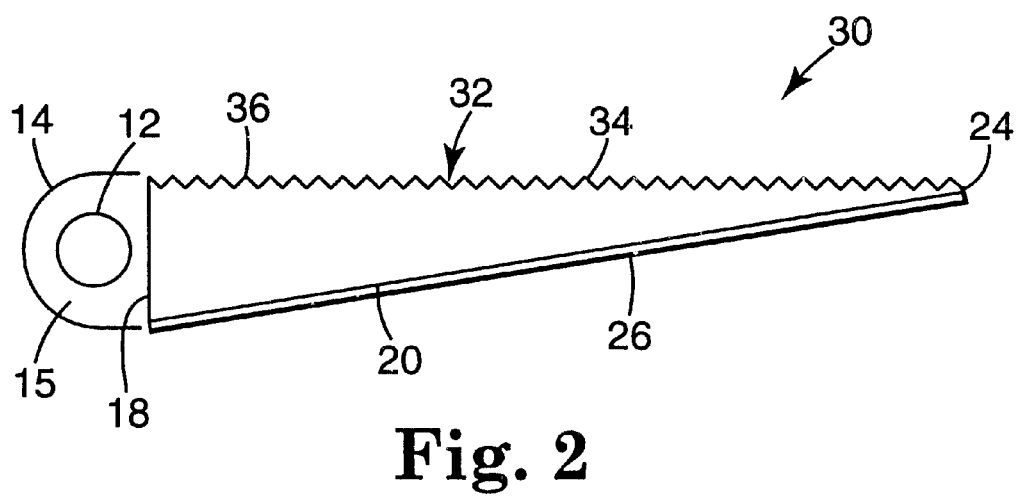
FIG. 2 is a schematic illustration of an illumination device including a wedge lightguide and a back reflector directly secured to the lightguide in accordance with an alternate embodiment of the invention.

A result of directly securing the back reflector to the lightguide is that the arrangement is extremely efficient at getting light out of the output surface of the lightguide. A drawback is that non-uniformities, imperceptible or only moderately perceptible in prior designs, are significant. Referring to FIG. 2, an illumination device 30 in accordance with an alternate embodiment of the invention includes a lightguide 32 with a diffuser 34 formed in the output surface 36 to hide or mask non-uniformities.

Figure 3:
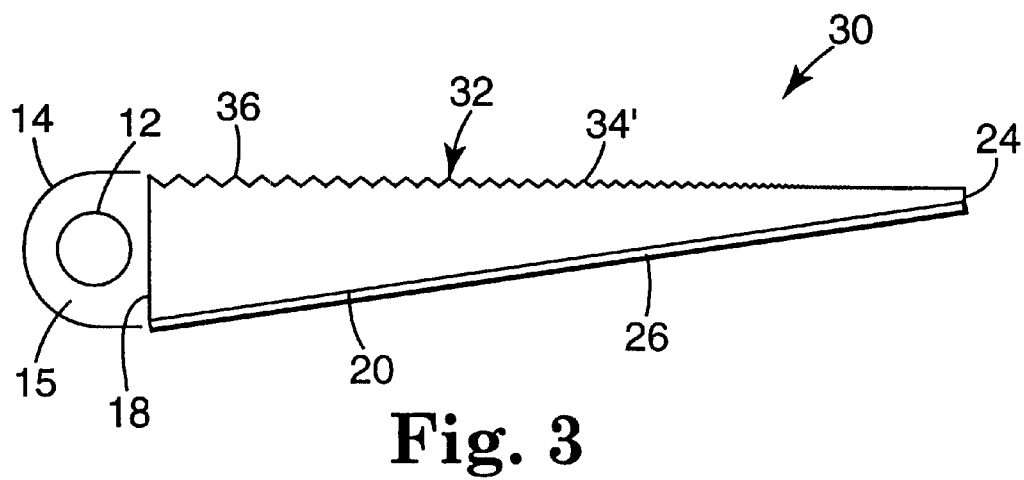
FIG. 3 is a schematic illustration of an illumination device including a wedge lightguide and a back reflector directly secured to the lightguide in accordance with an alternate embodiment of the invention.

The diffuser 34 may be formed integrally with the lightguide 32 by the inclusion of diffusive particles within the body of the lightguide 32, or a diffuser film may be directly secured, such as by adhesive bonding, to the output surface 36 of the lightguide 32. More preferably, the diffuser 34 may be formed directly in the output surface 36. In this regard, the diffuser 34 may be a uniform diffuser formed in the output surface. More preferably, the diffuser 34 incorporates programmed optical structures having a configuration described in commonly assigned US patent application entitled "Optical Element Having Programmed Optical Structures" filed of even date herewith (attorney docket no. 28724/35321), the disclosure of which is hereby expressly incorporated herein by reference. In this regard, and referring to FIG. 3, the diffuser 34' may include in-phase optical structures that have varying characteristics, for example tapering to naught from edge surface 18 to end surface 24, to selectively provide differing amounts of optical power at various locations of the output surface 36. While the addition of either the diffuser 34 or diffuser 34' may result in a decrease in the on-axis brightness of the illumination device 30 as compared to illumination device 10 without the diffuser, brightness is still increased as compared to prior illumination device designs and non-uniformities are significantly reduced. In an alternative arrangement the diffuser 34' may be formed with out-of-phase optical structures that have varying characteristics to selectively provide differing amounts of optical power at various locations of the output surface 36.

As discussed in the afore-mentioned U.S. patent application "Optical Element Having Programmed Optical Structures" virtually any tool configuration may be used to create the programmed optical structures forming diffuser 34. A tool having a flat tip may enhance the on-axis brightness of the illumination device 30.

As discussed above, the reflector may be secured to the lightguide by lamination using adhesives. Care must be taken to prevent contaminants from being introduced into the interface between the lightguide and the reflector. In this regard, adhesive may be applied to the lightguide and an adhesive free film manipulated into position with respect to the lightguide.

Figure 4:
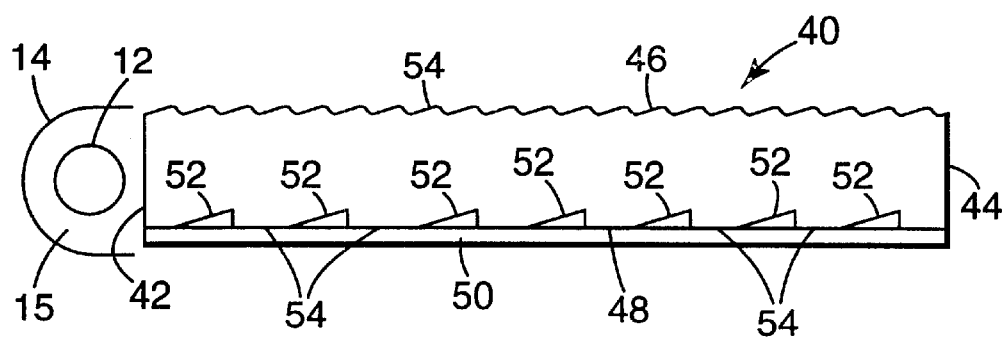
FIG. 4 is a schematic illustration of an illumination device including a pseudo-wedge lightguide and a back reflector directly secured to the lightguide in accordance with an alternate embodiment of the invention.

Referring now to FIG. 4, lightguide 40 includes an input edge surface 42, an opposing end surface 44, an output surface 46 and a back surface 48. Directly secured to the back surface 48 is a reflector 50. The lightguide 40 is shown as a slab, and the back surface 48 is formed with a plurality of optical structures 52. This configuration is referred to herein as a pseudo-wedge. The lightguide 40 may be cast to include the optical structures 52 or the optical structures 52 may be formed using suitable microreplication techniques in the back surface 48. The purpose of the optical structures 52 is to make the extraction of light from the lightguide 40 more uniform.

The reflector 50 is preferably directly secured to the back surface 48. In this regard, a thin layer of adhesive may be applied to either the plano surfaces 54 of the back surface 48 between the structures 52, or the adhesive may be applied to the reflector 50. A thin layer of adhesive is preferred so as not to fill the optical structures 52. As further shown in FIG. 3, the output surface 46 of the lightguide 40 may be formed with structures 52, which may be uniform or programmed.

Figure 5:
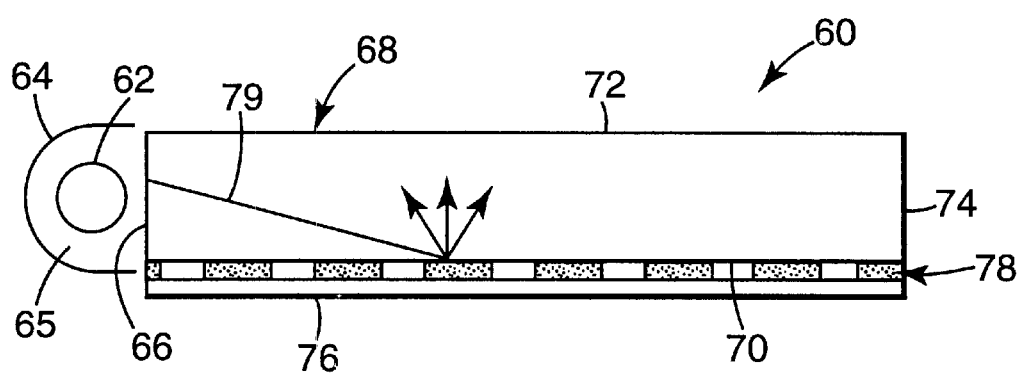
FIG. 5 is a schematic illustration of an illumination device including a lightguide and a back reflector directly secured to the lightguide in accordance with an embodiment of the invention.

Turning now to FIG. 5, an illumination device 60 includes a light source 62 with a light source reflector 64 forming a cavity 65 around the light source 62. The light source may be a CCFL. The light source 62 is arranged to provide light to an input edge surface 66 of a lightguide 68. The lightguide 68 is shown as a slab; however, it should be appreciated that the lightguide 68 may be a wedge or a pseudo-wedge. The lightguide 68 includes a back surface 70, an output surface 72 and an end surface 74 opposite the input edge surface 66.

The illumination device 60 also includes a diffuse reflector 76. A pattern of adhesive 78 is formed, such as by pattern transfer, onto the reflector 76, and the adhesive 78 is used to directly secure the reflector 76 to the back surface 70 of the lightguide 68. The pattern for the adhesive 78 is arranged with a spacing and density chosen to extract light efficiently and uniformly from the lightguide 68. A light ray 79 from the light source 62 encountering the adhesive 78 is diffusely reflected and extracted from the lightguide 68.

It will be appreciated that while the pattern of adhesive 78 is described as being formed on the reflector 76, the pattern of adhesive 78 may be formed on the lightguide 68. Such an arrangement may facilitate handling of the reflector 76, which is preferably a diffuse reflective film.

Figure 6:
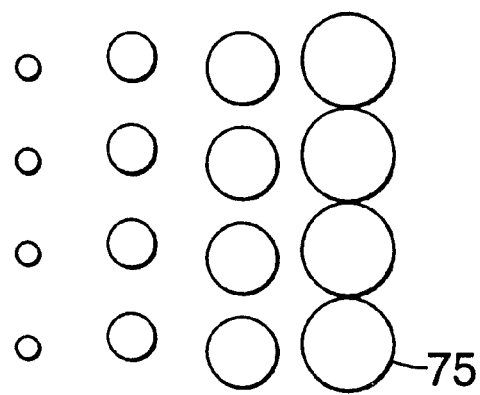
FIG. 6 is a schematic illustration of an adhesive pattern suitable for use in the illumination device of FIG. 5.
Figure 7:
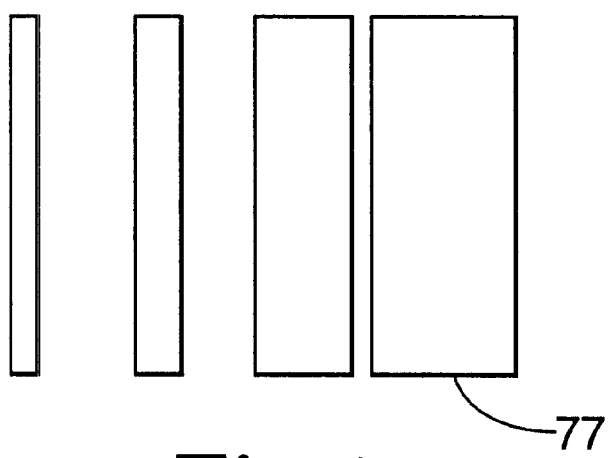
FIG. 7 is a schematic illustration of an adhesive pattern suitable for use in the illumination device of FIG. 5.

The adhesive 78 may be formed in a pattern of dots 75, such as illustrated in FIG. 6, distributed with an appropriate density and spacing to provide for the uniform extraction of light from the lightguide 68. The dots may be up to 1 mm in diameter where a diffuser is used between the lightguide 68, or where the lightguide 68 incorporates a diffuser, for example, by forming the diffuser into the output surface 72. The dots may also be made sufficiently small, for example less than 100 microns, so as to eliminate the need for a diffuser to obscure them. Alternatively, the pattern may be a plurality of spaced segments 77 as illustrated in FIG. 7. Of course patterns including other shapes may be used, providing that for the pattern selected the percentage of area covered by the pattern remains the same.

Figure 8:
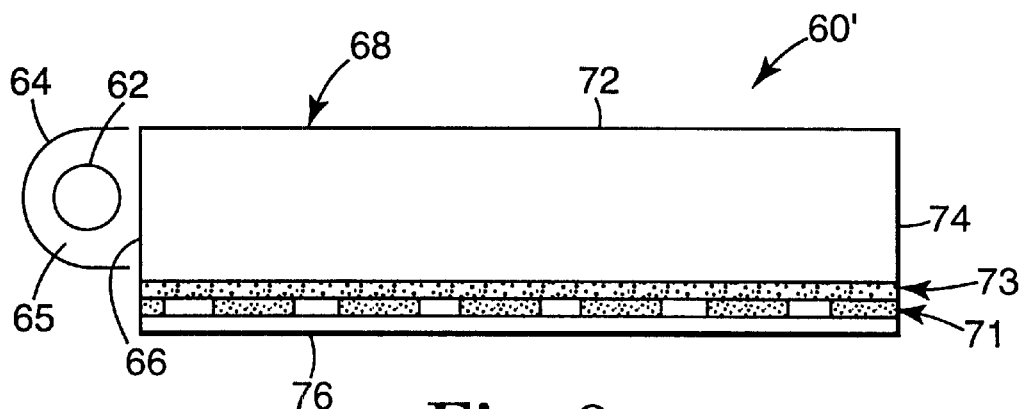
FIG. 8 is a schematic illustration of an illumination device including a lightguide and a back reflector directly secured to the lightguide in accordance with an alternative embodiment of the invention.

The illumination device 60' illustrated in FIG. 8 is similar in construction to the illumination device 60 of FIG. 5, and like reference numerals are used to represent like elements. In the illumination device 60', the reflector 76 is directly secured to the lightguide 74 by a continuous layer of adhesive 73. A diffuse pattern 71 is formed on a surface of the reflector 76. The diffuse pattern 71 provides for extraction of light from the lightguide 74 while the continuous layer of adhesive 73 eliminates air gaps between the reflector 76 and the lightguide 74. One of skill in the art will appreciate that the diffuse pattern 71 may alternatively be formed on the lightguide 74 and the reflector 76 directly secured by the continuous layer of adhesive 73. It should also be appreciated that the diffuse pattern 71 may be formed using a diffuse adhesive, paint, ink or similar material.

A further advantage of each of the embodiments of the invention is the elimination of a support frame for the back reflector. Existing designs utilize a frame member to support the reflector. By directly securing the reflector to the lightguide the support frame is no longer required, resulting in fewer parts in the display system and a lighter overall display.

Figure 9:
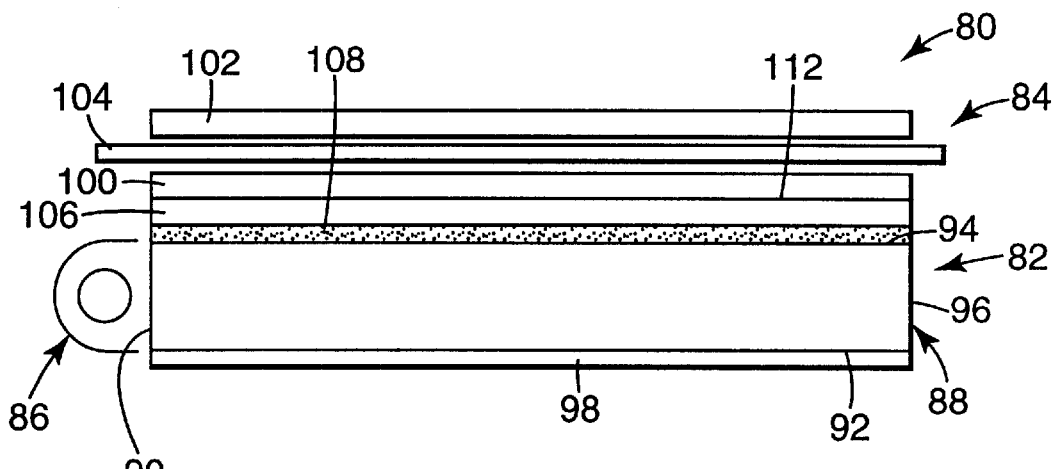
FIG. 9 is a schematic illustration of a display device including a lightguide and a directly secured polarizer in accordance with an embodiment of the invention.

Referring now to FIG. 9, a display device 80 includes an illuminating device 82 and a liquid crystal display (LCD) 84. The illuminating device 82 includes a light source 86 and a lightguide 88. The lightguide 88 includes an input edge surface 90, a back surface 92, an output surface 94 and an end surface 96. A reflector 98 is provided, and may be directly secured to the back surface 92 although such a configuration is not required. The LCD 84 includes a bottom surface panel 100 and a top surface panel 102, which together contain a liquid crystal layer 104.

A polarizer 106 is directly secured to the output surface 94. The polarizer 106 may be a reflective polarizer such as described in commonly assigned U.S. Pat. Nos. 5,828,488 and 5,783,120, the disclosures of which are hereby expressly incorporated herein by reference. The polarizer 106 also may be a cholesteric polarizer or another type of polarizer.

The polarizer 106 is preferably secured directly to the output surface 94 by a layer 108 of adhesive. The adhesive may be transmissive having an index the same or very nearly the same as the lightguide 88. The adhesive may also be diffuse. For a diffuse adhesive small dielectric particles may be placed into the adhesive resin. The dielectric particles would be selected to have a small difference in refractive index as compared to the resin, and may be either polarization preserving or polarization scattering depending largely on the type of the polarizer. The diffuse nature of the adhesive may advantageously provide for the masking of non-uniformities in the output of the illumination device 80.

It would also be possible, and in some instances desirable, to mask non-uniformities in the output of the illumination device 80 by forming a optical structures into the output surface 112 of the reflective polarizer 106. The optical structures may provide a uniform amount of diffusion over the entire output surface 112. Alternatively, the optical structures may be formed as described in the aforementioned U.S. patent application entitled "Optical Element Having Programmed Optical Structures". As such, the optical structures would provide varying amounts of optical power over the output surface 112.

Figure 10:
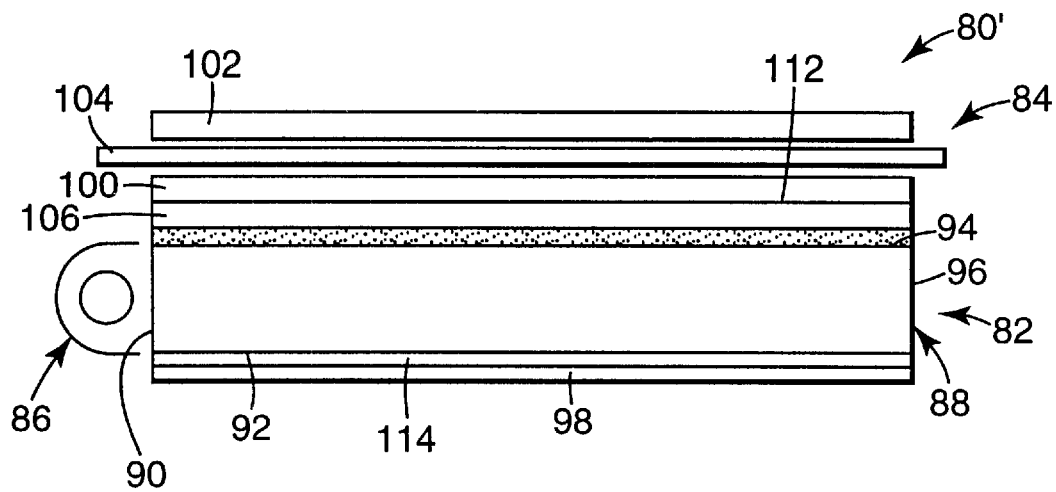
FIG. 10 is a schematic illustration of a display device including a lightguide and a directly secured polarizer in accordance with an alternate embodiment of the invention.

The polarizer 106 may require alignment such that its transmissive properties correspond with the transmissive properties of the LCD 84. While certain implementations will require the illumination system be polarization preserving, it may also be desirable to provide some polarization scattering within the illumination system 82. This can be accomplished as described above by using polarization scattering diffuse adhesive to directly secure the polarizer 106 to the output surface 94. In the display 80α illustrated in FIG. 10, which is similar in construction to the display 80 shown in FIG. 9 and like reference numerals are used to represent like elements, a polarization retarder 114, such as a birefringent film retarder, is disposed between the back surface 92 and the reflector 98. The polarization retarder 114 may be directly secured, such as by lamination, to the back surface 92, and the reflector 98 directly secured, such as by lamination, to the polarization retarder 114, although such a configuration is not required. It should be appreciated, in fact, that the polarization retarder 114 may be disposed between the polarizer 106 and the output surface 94 of the lightguide 88.

The invention has been described in terms of several preferred embodiments. Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the intention, and the exclusive use of all modifications which come within the scope of the appended claims is reserved.

We claim:

1. A lightguide comprising:
an optically transmissive monolith having an input edge, a back surface and an output surface; and
a reflector directly secured to the back surface by a patterned layer of adhesive, wherein the patterned layer of adhesive is arranged to extract light from the lightguide.

2. The lightguide of claim 1, wherein the reflector is laminated to the back surface.

3. The lightguide of claim 1, wherein the reflector comprises a substantially non-absorbing specular reflecting film.

4. The lightguide of claim 1, further comprising a diffuser formed in the output surface.

5. The lightguide of claim 4, wherein the diffuser comprises a plurality of programmed optical structures providing preselected differing amounts of optical power at preselected differing locations on the output surface.

6. The lightguide of claim 1, wherein the monolith includes diffusive particles distributed within a volume of the monolith.

7. The lightguide of claim 1, wherein the monolith comprises one of a slab, a wedge and a pseudo-wedge.

8. The lightguide of claim 1, wherein the patterned layer of adhesive comprises a dot pattern.

9. The lightguide of claim 1, wherein the adhesive is diffuse.

10. An illumination device comprising:
a light source including a light source reflector forming a light source cavity about the light source;
an optically transmissive monolith having an input edge, a back surface and an output surface, wherein the light source is disposed to provide light to the input edge; and
a reflector secured to the back surface by a patterned layer of adhesive.

11. The illumination device of claim 10, wherein the reflector comprises a substantially non-absorbing specular reflecting film.

12. The illumination device of claim 10, further comprising a diffuser formed in the output surface.

13. The illumination device of claim 12, wherein the diffuser comprises a plurality of programmed optical structures providing preselected differing amounts of optical power at preselected differing locations on the output surface.

14. The illumination device of claim 10, wherein the monolith includes diffusive particles distributed within a volume of the monolith.

15. The illumination device of claim wherein the monolith comprises one of a slab, a wedge and a pseudo-wedge.

16. The illumination device of claim 10, wherein the patterned layer of adhesive comprises a dot pattern.

17. The illumination device of claim 10, wherein the adhesive comprises a diffuse adhesive.

18. The illumination device of claim 10, further comprising a polarizer directly secured to the output surface.

19. The illumination device of claim 18, wherein the polarizer is secured by a continuous layer of adhesive.

20. The illumination device of claim 19, further comprising a polarization retarder disposed between the polarizer and the reflector.

21. method of making a lightguide comprising:
providing an optically transmissive monolith having an input edge, a back surface and an output surface;
providing a reflector, the reflector being sized to substantially cover the entire back surface;
disposing an adhesive in a distributed pattern having a density and a spacing of the adhesive on the back surface to provide substantially uniform extraction of light from the lightguide; and
bonding the reflector to the back surface using the adhesive.

22. The method of claim 21, wherein the reflector comprises a substantially non-absorbing specular reflecting film.

23. A lightguide comprising:
an optically transmissive monolith having an input edge, a back surface and an output surface; and
a polarizer directly secured to the output surface by a patterned layer of adhesive.

24. A lightguide comprising:
an optically transmissive monolith having an input edge, a back surface and an output surface; and
a polarizer directly secured to the output surface by a continuous layer of adhesive.

* * * * *

UNITED STATES PATENT AND TRADEMARK OFFICE
CERTIFICATE OF CORRECTION

PATENT NO. : 6,447,135 B1
DATED : September 10, 2002
INVENTOR(S) : Wortman et al.

It is certified that error appears in the above-identified patent and that said Letters Patent is hereby corrected as shown below:

<u>Column 8,</u>
Line 9, please delete "The illumination device of claim wherein" and insert -- The iliumination device of claim 10, wherein -- therefore.
Line 22, please delete "method of making" and insert -- A method of making -- therefore.

Signed and Sealed this

Tenth Day of June, 2003

JAMES E. ROGAN
*Director of the United States Patent and Trademark Office*